US006534189B1

(12) United States Patent
Burns et al.

(10) Patent No.: US 6,534,189 B1
(45) Date of Patent: *Mar. 18, 2003

(54) UNIAXIALLY SHRINKABLE BIAXIALLY ORIENTED POLYPROPYLENE FILM AND METHOD FOR USE AS TOBACCO PACK OVERWRAP

(75) Inventors: Donald J. Burns, Fairport, NY (US); David A. Liestman, Canandaigua, NY (US); Barry C. Rice, Newark, NY (US); Lajos Edward Keller, Fairport, NY (US); Marie-France M. Nothnagle, Fairport, NY (US)

(73) Assignee: ExxonMobil Oil Corporation, Fairfax, VA (US)

( * ) Notice: Subject to any disclaimer, the term of this patent is extended or adjusted under 35 U.S.C. 154(b) by 3 days.

This patent is subject to a terminal disclaimer.

(21) Appl. No.: 09/887,657

(22) Filed: Jan. 9, 2000

Related U.S. Application Data

(63) Continuation of application No. 08/873,133, filed on Jun. 10, 1997, now abandoned, which is a continuation-in-part of application No. 08/427,785, filed on Apr. 25, 1995, now Pat. No. 5,691,043, which is a continuation-in-part of application No. 08/276,124, filed on Jul. 15, 1994, now abandoned, and a continuation-in-part of application No. 08/806,428, filed on Feb. 26, 1997, now Pat. No. 6,322,883.

(51) Int. Cl.[7] .......................... B32B 27/32; B32B 27/18
(52) U.S. Cl. .................. 428/447; 428/516; 428/910
(58) Field of Search ................ 428/447, 34.9, 428/516, 910, 409

(56) References Cited

U.S. PATENT DOCUMENTS 5,302,442 A * 4/1994 O'Brien et al. ............ 428/213

5,691,043 A * 11/1997 Keller et al. ............... 428/212

FOREIGN PATENT DOCUMENTS

| EP | 0388086 | 9/1990 |
|----|---------|--------|
| EP | 0651004 | 5/1995 |
| WO | 96/02386 | 2/1996 |
| WO | 96/33864 | 10/1996 |
| WO | 98/38041 | 9/1998 |
| WO | 99/02331 | 1/1999 |
| WO | 99/51232 | 10/1999 |

* cited by examiner

Primary Examiner—D. Lawrence Tarazano
(74) Attorney, Agent, or Firm—Rick F. James; Keith A. Bell

(57) ABSTRACT

A uniaxially heat-shrinkable, biaxially oriented, multilayer film for use as a tobacco pack or carton overwrap having a polypropylene-containing core layer comprising at least 70 wt % of said multilayer film and at least one polyolefin-containing skin layer adjacent said core layer is prepared by biaxially orienting a coextrudate and thereafter orienting said coextrudate by stretching 10 to 45% in the machine direction. The core layer contains isotactic polypropylene and a modifier which reduces the crystallinity of the polypropylene-containing core. Such modifiers can be selected from the group consisting of atactic polypropylene, syndiotactic polypropylene, ethylene-propylene copolymer, propylene-butene-1 copolymer, ethylene-propylene-butene terpolymer, polyethylene and linear low density polyethylene. The skin layer can be selected from the group consisting of polypropylene, ethylene-propylene copolymer, polyethylene, and ethylene-propylene-butene-1 terpolymer and contains silicone oil.

11 Claims, 1 Drawing Sheet

UNIAXIALLY SHRINKABLE BIAXIALLY ORIENTED POLYPROPYLENE FILM AND METHOD FOR USE AS TOBACCO PACK OVERWRAP

RELATED APPLICATIONS

This application is a continuation of application Ser. No. 08/873,133, filed on Jun. 10, 1997 abandoned, which is a continuation-in-part of U.S. application Ser. No. 08/427,785, filed Apr. 25, 1995 U.S. Pat. No. 5,691,043, which is a continuation-in-part of U.S. application Ser. No. 08/276,124 abandoned filed Jul. 15, 1994, and U.S. application Ser. No. 08/806,428 U.S. Pat. No. 6,322,883, filed Feb. 26, 1997, the entire contents of which are incorporated herein by reference.

BACKGROUND OF THE INVENTION

The present invention relates to the field of polymer films and, more particularly to a uniaxially heat shrinkable biaxially oriented polypropylene film. As noted in U.S. Pat. No. 4,194,039, polyolefins can be used to prepare shrink films for wrapping purposes. Other suitable synthetic resins include various ionomers, polyvinyl chlorides, polyesters, polystyrenes and polyvinylidene chlorides.

A shrink film's distinguishing characteristic is its ability upon exposure to some level of heat to shrink or, if restrained, to create shrink tension within the film. This ability is activated by the packager when the wrapped product is passed through a hot air or hot water shrink tunnel. The resulting shrinkage of the film results in an aesthetically pleasing transparent wrapping which conforms to the contour of the product while providing the usual functions required of packaging materials such as protection of the product from loss of components, pilferage, or damage due to handling and shipment. Typical items wrapped in polyolefin shrink films are toys, games, sporting goods, stationery, greeting cards, hardware and household products, office supplies and forms, foods, phonograph records, and industrial parts.

The manufacture of shrink films requires relatively sophisticated equipment including extrusion lines with "racking" capability, irradiation units when cross-linking is desired, tenter frames, mechanical centerfolders, and slitters. "Racking" or "tenter framing" are conventional orientation processes which cause the film to be stretched in the cross or transverse direction and in the longitudinal or machine direction. The films are usually heated to their orientation temperature range which varies with different polymers but is usually above room temperature and below the polymer's melting temperature. After being stretched, the film is rapidly cooled to quench it thus freezing the molecules of film in their oriented state. Upon heating, the orientation stresses are relaxed and the film will begin to shrink back to its original, unoriented dimension.

Certain applications, e.g., labeling, covering, or packaging of materials such as boxes, plates, vessels, bottles, tubes, cylindrical material, e.g., pipes, and rods, etc. are especially susceptible to covering with heat shrinkable films. However, in certain situations it is desirable to effect shrinkage along a single axis without substantial shrinkage in the cross-direction. For example, in the process of labeling bottles by shrinking a tube of heat shrinkable material, if the film shrinks along its length, the label may not be placed in the right position but rather placed at above the desired position upon shrinkage. Moreover, printing and other conversion processes of such label surfaces require heat stability in substantially one direction to meet machinability requirements. Uniaxially shrinkable materials can also be used in preparing tightly wrapped containers by lap heat sealing uniaxially shrinkable film resulting in shrink down of the wrapping.

In order to obtain uniaxially shrinkable materials it is possible to employ uniaxially oriented materials, i.e., materials which are oriented in only one direction. However, uniaxially oriented film can lack the requisite strength and toughness necessary for use in such applications. Inasmuch as biaxially oriented films exhibit desirable strength and tear resistance in both directions of orientation, it would be desirable to obtain a uniaxially heat shrinkable film which is biaxially oriented and thus substantially stable in the cross-direction.

For more detailed disclosures of heat shrinkable films, reference may be had to aforesaid U.S. Pat. No. 4,194,039, as well as U.S. Pat. Nos. 3,808,304; 4,188,350; 4,377,616; 4,390,385; 4,448,792; 4,582,752; and 4,963,418, all of which are incorporated herein by reference.

U.S. Pat. No. 5,292,561 (corresponding to EPA 0498249) discloses a process for producing polyolefin shrink films having high unidirectional shrinkage (at least 10% longitudinal shrinkage and less than 2% transverse shrinkage at 100° C.) under conditions comprising an MD reorientation mechanical MD/TD draw ratio between 1.01 and 7.5. The base layer of the films contain propylene polymer and optionally, hydrogenated hydrocarbon resin.

EPA 0204843 discloses a low temperature shrinkable film comprising linear low-density polyethylene resin having film shrink properties of 30% or more MD and 5% or less TD at 90° C., which is prepared by drawing the film at a high draw ratio (3 to 6) in the machine direction.

EPA 0321964 describes a process for extruding a shrink film from a linear low density copolymer of ethylene and at least one alpha-olefin having 3 to 6 carbon atoms to provide a material which exhibits shrinkage at 135° C. of at least 30% MD and at least 10% TD.

EPA 0477742 discloses a transparent polypropylene shrink film which exhibits shrinkage at 100° C. of at least 10% MD and less than 2% TD. The polypropylene comprises a 15% or less, preferably 2 to 6% n-heptane soluble component.

EPA 0299750 discloses a mono- or biaxially stretched film having a heat shrinkage of 20% or more in one of the longitudinal and transverse directions and 60% or more in the other direction. The film comprises principally a linear polyethylene and optionally, a branched low-density polyethylene.

EPA 0595270 discloses a heat sealable laminate having high unidirectional shrinkage produced from biaxially oriented polymeric film such as biaxially oriented polypropylene or blends of polypropylene and copolymers of propylene with minor amounts of ethylene or an alpha-olefin. Uniaxial shrinkability is achieved by balancing MD reorientation process variables such as temperature, draw ratio, line speed, and oriented polymer film properties. Heat sealability is imparted by the presence of a heat seal layer.

U.S. Patent Nos. 4,058,645; 4,604,324; 4,764,425; 4,911,976 disclose films suitable for high speed packing operations, such as high speed cigarette pack wrapping machines and cigarette carton wrapping machines. Nevertheless, despite the advances in film packaging technology as exemplified by the above referenced patents, their films suffered from one or more shortcomings. For example, some of the films, when used in high speed cigarette package wrapping machines, have a tendency for the film surfaces of contacting packages to stick together, particularly in areas where heat sealing has occurred, and to have a tendency to wrinkle.

It is an object of the present invention to provide a uniaxial heat shrinkable, biaxially oriented multilayer film comprising a polypropylene core and a skin layer comprising silicone oil for use as a tobacco pack or carton overwrap.

SUMMARY OF THE INVENTION

The present invention relates to a uniaxially heat-shrinkable, biaxially oriented, multilayer film having a polypropylene-containing core layer, said core layer comprising isotactic polypropylene and a modifier which reduces the crystallinity of the polypropylene-containing core layer and at least one polyolefin-containing skin layer adjacent said core layer, said skin layer comprising silicone oil.

DETAILED DESCRIPTION OF THE INVENTION

Core

Figure 1:
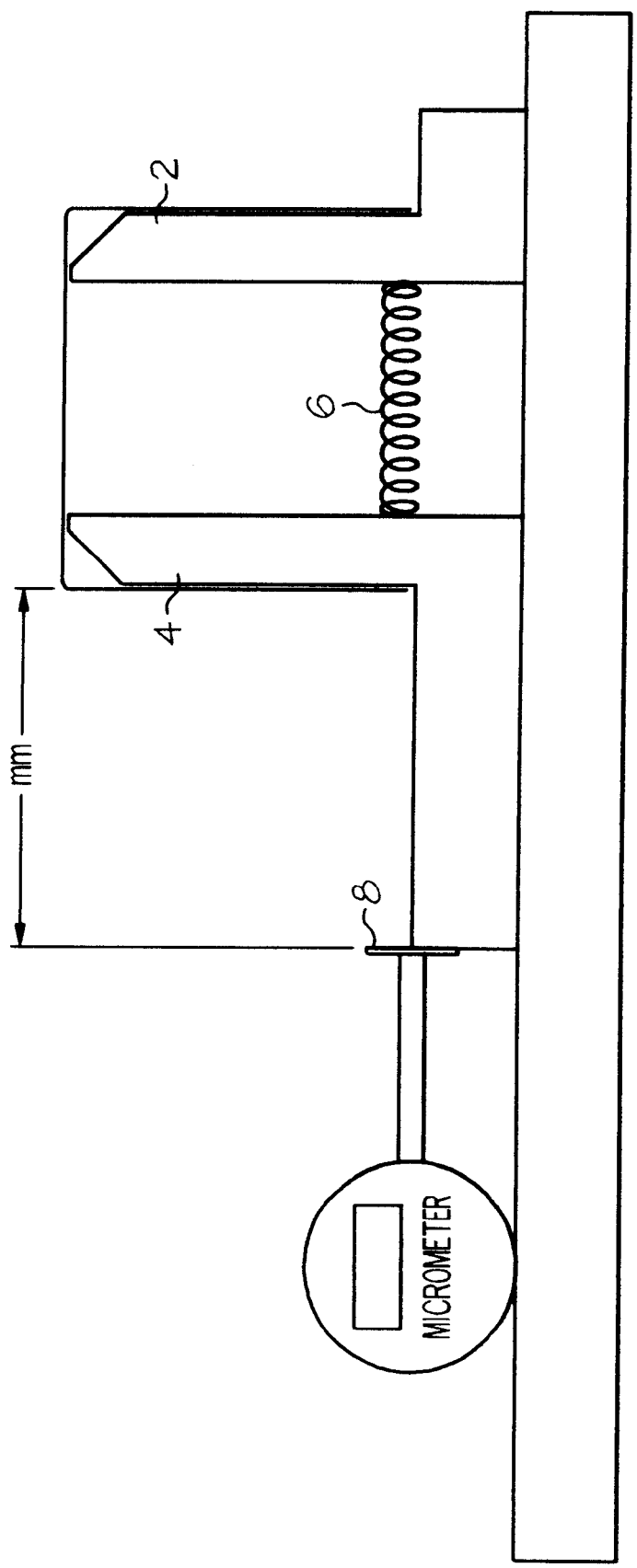
FIG. 1 shows an apparatus for measuring cigarette pack wrap tightness.

The composition of the polypropylene-containing core layer of the multilayer film of the present invention must provide sufficient operability so that the film after biaxial orientation exhibits crystallinity which is low enough to permit the secondary orientation of the film, which imparts the uniaxial shrinkability to the film, without tearing. The core layer material can be a single polypropylene homopolymer material which is sufficiently atactic and which has a specific melting point, as determined by the DSC (Differential Scanning Calorimetery) method, e.g., at a heating rate of 2° C./minute. Alternately, the core layer material can comprise a blend of a more isotactic polypropylene with modifiers which are polyolefin materials which are less crystallizable than isotactic polypropylene due to a higher degree of chain imperfections, lower isotacticity, blended or not, or a different tacticity such as atactic or syndiotactic polypropylene. Suitable DSC melting points for the core layer, blended or not, can be less than 160° C., e.g., less than 150° C., or even less than 140° C.

Modifiers suited to use in the present invention include polyolefins other than isotactic polypropylene. The modifier can be selected from the group consisting of atactic polypropylene, syndiotactic polypropylene, ethylene-propylene copolymer, propylene-butene-1 copolymer, ethylene-propylene-butene-1 terpolymer, polybutene-1, polyethylene and linear low density polyethylene.

Several ways have been found to provide a polypropylene core having the desired post primary orientation crystallinity. The desired crystallinity avoids tearing of the biaxially oriented film during secondary orientation at stretch levels of greater than 30% or greater than 35%, e.g., up to 40% or even up to 45%. Isotactic polypropylene, i.e., polypropylene having less than 5% atacticity, say less than about 3% atacticity, can be combined with a modifier, e.g., atactic polypropylene, to provide a suitable core layer. Atactic content can be measured by a polymer's insolubility in boiling n-hexane with chain imperfections or atactic differences being observed via NMR tests.

In one aspect of the present invention, the modifier, e.g., atactic polypropylene, is added to the core in amounts sufficient to provide a core layer having an overall atacticity greater than 2%, preferably greater than 4%, greater than 5% or greater than 6%, say, e.g., 6 to 15%. For present purposes, atactic polypropylene has an atacticity of at least 10%, preferably at least 15%, e.g., 15 to 20% or 15 to 25%. Atactic polypropylene can be used alone as the core or added to isotactic polypropylene in amounts such that the resulting mixture comprises 10 to 99 wt % atactic polypropylene, e.g., 10 to 30 wt %, preferably 15 to 20 wt %. atactic polypropylene. Blends of 15 wt % atactic polypropylene (15% atacticity) and 85 wt % isotactic polypropylene (of 4 to 5% atacticity) are especially preferred.

A suitable atactic polypropylene for use in the present invention has an atacticity of 15% which can be added to isotactic polypropylene to provide a core mixture containing 15 wt % atactic polypropylene thereby increasing overall core atacticity by 2.25 wt %.

Commercially available isotactic propylene suited to use in the present invention includes Fina 3371 from Fina Oil and Chemical Co., Chemical Div., Dallas, Tex. Atactic polypropylenes which are commercially available include L1300 from Novolen of BASF Corp., Parsippany, N.J.

In another embodiment, the present invention employs a core layer which comprises polypropylene as described above, preferably isotactic polypropylene, mixed with polybutene-1 modifier to provide a core layer containing 2 to 15 wt % polybutene-1, preferably 5 to 10 wt % polybutene-1. Suitable polypropylene/polybutene-1 homogeneous blends are described in U.S. Pat. No. 3,808,304, the disclosure of which is incorporated by reference herein. This disclosure teaches blends containing from 30 to 90 weight parts of polypropylene, and correspondingly, from 70 to 10 weight parts of polybutene-1. Suitable polybutene-1s include PB 8430, available from Shell Chemical Co. of Houston, Tex. In yet another aspect of the invention, the core layer comprises polypropylene as described above, preferably isotactic polypropylene, mixed with ethylene-propylene copolymer modifier, e.g., 2 to 10 wt % ethylene-propylene copolymer, preferably 3 to 10 wt % E-P copolymer. Suitable E-P copolymer can contain from 2 to 7 weight percent ethylene, the balance being propylene. The copolymers can have a melt index at 230° C. generally ranging from 2 to 15, preferably from 3 to 8. The crystalline melting point is usually from about 125° C. to about 150° C., and the number average molecular weight is about 25,000–100,000. The density is preferably from 0.89 to 0.92 g/cm$^3$. Suitable E-P copolymers include EP 8573, available from Fina Oil and Chemical Co., Chemical Div., Dallas, Tex.

In still another aspect of the invention, the core layer is a blend of polypropylene as described above, preferably isotactic polypropylene, mixed with 0 to 10 wt % ethylene-propylene copolymer, said copolymer preferably being 50 to 100 wt % E-P copolymer which contains from 0.5 to 1 wt % ethylene, the balance being propylene. These fractional copolymers are commercially available as ready-mix resin containing 0.6 wt % ethylene (4173 from Fina).

In another aspect of the invention, the core layer is a blend of polypropylene as described above, preferably isotactic polypropylene, mixed with propylene-butene-1 copolymer. The core layer can comprise 5 to 20 wt % propylene-butene-1 copolymer, preferably 10 to 20 wt %. Suitable propylene-butene-1 copolymers include Cefor SRD4-105, and Cefor SRD4-104 available from Shell Chemical Co. The core layer can comprise 5 to 20 wt % of said propylene-butene-1 copolymer as modifier.

In yet another aspect of the invention, the core layer is a blend of polypropylene as described above, preferably isotactic polypropylene, mixed with linear low density polyethylene (LLDPE). These polymers typically have a melt index of 1 to 10. The linear low density polyethylenes should have a density in the range 0.88–0.94 g/cc, preferably, 0.89–0.92 g/cc. The linear low density polyethylenes may be derived from ethylene together with other higher comonomers such as butene-1, hexene-1 or octene-1. The core layer can comprise 2 to 15 wt % LLDPE, preferably 5 to 10 wt % LLDPE. Commercially available LLDPEs include Exact 2009, Exact 2010, and Exact 3016 available from Exxon Chemical Co.

In a particularly preferred embodiment, the core layer is a blend of polypropylene as described above, preferably isotactic polypropylene, mixed with syndiotactic polypropylene and, optionally, ethylene-propylene copolymer. Syndiotactic polypropylene can be present in the core layer in amounts ranging from 2 to 10 wt %, say, 4 to 8 wt %, preferably 4 to 6 wt %, with 0 to 40 wt % ethylene-propylene copolymer, preferably 0 to 20 wt % E-P copolymer. Suitable E-P copolymers are described above. The presence of E-P copolymer improves MD tensile strength in the secondary orientation step. However, E-P copolymer content must be carefully determined in as much as the presence of E-P copolymer can cause undesirable film elongation even at lower temperatures, e.g., 60° C. (140° F.) drying temperatures, which elongation can cause registration problems during converting processes such as printing.

The syndiotactic polypropylene used as a modifier in the present invention can possess a mean length of sequence of less than 15%, in particular less than 6%. The mean length of sequence ~$n_r$ of the syndiotactic sequences is preferably greater than about 20, more preferably greater than about 25. The molar mass distribution corresponds to the relation $$M_w = k \times M_n,$$

where $M_w$ stands for the weight average of the molar mass distribution, $M_n$ stands for the number average of the molar mass distribution and k is a factor which is between about 1 and about 5, preferably between about 2 and about 3.

The weight average is preferably between about 60,000 and about 250,000, in particular between about 90,000 and about 160,000. The mean molar masses can be determined according to customary methods; of these, the method of gel permeation chromatography has proven to be particularly suitable.

Commercially available syndiotactic polypropylene resins suited to use in the present invention include EOD 9306 and EOD 9502 available from Fina.

In yet another aspect of the invention, the core layer is a blend of polypropylene as described above, preferably isotactic polypropylene, mixed with ethylene-propylene-butene-I terpolymer as modifier. The core layer can comprise 5 to 20 wt % of the terpolymer. Suitable terpolymers include those containing 3 to 5 wt % ethylene and 3 to 6 wt % butene-1. Such terpolymers are available from Chisso, under the tradename Chisso 7700 Series. Other suitable ethylene-propylene-butene-1 terpolymers include those containing 0.5 to 3 wt % ethylene, and 13 to 20 wt % butene-1. Such terpolymers are available from Chisso, under the tradename Chisso 7800 Series.

Suitable core layers of the present invention can comprise recycled polypropylene (RPP), e.g., up to 25 wt % RPP, preferably up to 15 wt %. RPP. An optional additive for inclusion in the core layer is a glycerol or glyceride which may when used preferably be included in amounts between about 0.05 and 0.3% by weight of the layer and most preferably at about 0.1% by weight. The core layet may also contain effective amounts of other suitable anti-static agents. The anti-static agents compounded with the core layer include but are not limited to tertiary amines and glycerides, such as glycerol monostearate. Examples of tertiary amines are N,N-bis(2-hydroxyethyl) alkenyl or mixed alkenyl amines and alkyl $C_6$–$C_{18}$ coco and tallow amines. The preferred amines are N,N bis(2-hydroxyethyl) stearylamine, N,N-bis(2-hydroxyethyl) cocoamine or a mixture of amines containing the same.

Skin Layer

The skin layer of the present invention may be any of the coextrudable, biaxially orientable heat shrinkable film-forming resins known in the prior art. Such materials include those discussed above which are suited to use in the core layer, including isotactic polypropylene, atactic polypropylene, polypropylene blended with polybutene-1, propylene-butene-1 copolymer, and ethylene-propylene copolymer, including fractional E-P copolymer. In addition, polyethylene or ethylene-propylene-butene-1 terpolymer may be employed as the skin layer.

The multilayer film of the present invention is especially suitable for use in the tobacco industry. When used as a tobacco wrap or carton overwrap, both skin layers must be sealable.

Ethylene-propylene-butene-1 random terpolymers suited to use in the skin layers of the present invention include those containing 1–5 weight percent random ethylene, 10–25 weight percent random butene-1. The amounts of the random ethylene and butene-1 components in these copolymers are typically in the range of 10 to 25 percent total (ethylene plus butene-1). Typical terpolymers of this type include those with about 1–5 percent ethylene and 10–25 percent butene-1.

These copolymers typically have a melt flow rate in the range of about 5 to 10 with a density of about 0.9 and a melting point in the range of about 115° to about 130° C.

In one aspect of the invention the skin layer is derived from a linear low density polyethylene (LLDPE). These polymers typically have a melt index of 1 to 10. The linear low density polyethylenes may have a density as high as 0.94, usually in the range 0.90–0.91, e.g., 0.92 or 0.91, with a melt index from about 1 to about 10. The linear low density polyethylenes may be derived from ethylene together with other higher comonomers such as butene-1, hexene-1 or octene-1.

Each skin layer adjacent to the core layer can range in thickness from 0.5 to 3 microns (0.02 to 0.12 mil), preferably 0.5 to 1.0 micron (0.02 to 0.04 mil), e.g., 0.5 to 0.75 micron (0.02 to 0.03 mil).

Prior to incorporation in the film, e.g., before extrusion, at least one of the skin layers can be compounded with an anti-blocking effective amount of an anti-blocking agent, e.g., silica, clays, talc, glass, and the like which are preferably provided in the form of approximately spheroidal particles. The major proportion of these particles, for example, anywhere from more than half to as high as 90 weight percent or more, will be of such a size that significant portion of their surface area, for example, from about 10 to 70 percent thereof, will extend beyond the exposed surface of the skin layer. In a preferred embodiment, the anti-blocking agent comprises non-meltable silicone resin, e.g., particulate cross-linked hydrocarbyl-substituted polysiloxanes. Particularly preferred particulate cross-linked hydrocarbyl-substituted polysiloxanes include the polymonoalkylsiloxanes. Most particularly preferred are non-meltable polymonoalkylsiloxanes characterized as having a mean particle size of 0.5 to 20.0 microns and a three dimensional structure of siloxane linkages. Such materials are available from Toshiba Silicone Co., Ltd., worldwide, and in the United States from General Electric Co., and are marketed under the tradename Tospearl. Other commercial sources of similar suitable materials are also known to exist. Such materials are further described as non-meltable crosslinked organosiloxane resin powders in U.S. Pat. No. 4,769,418, incorporated herein by reference. Effective amounts of the particulate cross-linked hydrocarbyl-substituted polysiloxane anti-blocking agent can range from 100 to 5000 ppm, preferably 1000 to 3000 ppm, say, from 2500 to 3000 ppm, based on loading of the resin from which the upper layer (c) is prepared.

Reduced coefficient of friction and reduced antistatic characteristics at the surface of the skin layer or layers can be achieved in accordance with the disclosure set out in U.S. Pat. No. 5,264,277, incorporated herein by reference, which discloses the use of migratory slip agents and antistatic agents in multilayer films, such as erucamide. Reduced COF may also be obtained by treating one or both skins with silicone oil.

An important component of the herein embodied multilayer film structure is the silicone oil. The silicone oil is incorporated into one or both of the heat sealable skin layers in an amount such that a low coefficient of friction is maintained on one or both of the skin layers. The silicone oil is preferably added in amounts between about 0.3 wt. % to about 3.0 wt. % of the skin layer and up to about 5 wt. % by weight.

The silicone oil, preferably is a polydimethylsiloxane, having a viscosity of about 20,000 to 3,000,000, preferably 20,000 to 30,000 centistokes.

To further aid the heat seal characteristics and improve the optical properties of the film, the skin layer or layers can also contain up to 10 wt. % of a natural or synthetic terpene resin, a wax, or alow molecular weight (e.g. 10,000) polyethylene.

An optional additive for inclusion in the skin layer or layers is glycerol or glyceride which may when used be included in amounts between about 0.05 and 0.3 wt. % of the skin layer.

If desired, the exposed surface of the skin layer or skin layers can be treated in a known and conventional manner, e.g., by corona discharge to improve its receptivity to printing inks, coatings, adhesive anchorage, and/or its suitability for such subsequent manufacturing operations as lamination.

It is preferred that all layers of the multilayer film structures of the present invention be coextruded, after which the film can be biaxially oriented (primary orientation) and thereafter secondarily oriented in the direction in which shrinkability is desired. Coextrusion can be carried out in a multilayer melt form through a flat die.

Primary Orientation

The multilayer coextrudate film can be primarily oriented biaxially. Biaxially oriented film can be stretched 3 to 8 times, preferably 4 to 6 times in a first direction, preferably the machine direction (MD), and 6 to 12 times in a second direction which is substantially normal to the first direction, preferably the transverse direction (TD). Biaxial orienting can be carried out using a conventional tenter or stenter machine at a drawing temperature of 100° to 140° C., e.g., 130° C. Generally, biaxial orientation temperatures differ for MD orientation (115° to 130° C., e.g., 120° C.) and TD orientation (130° to 160° C., e.g., 150° C.). Film thickness at this stage can range from 25 to 75 microns (0.7 to 3 mils), preferably 25 to 50 microns (0.7 to 2 mils). Cooling of the film to temperatures below 100° C. occurs prior to secondary orientation.

Secondary Orientation

The primarily oriented film is then reheated to 100 to 125° C., say 110 to 115° C., preferably by use of heated cylinders and stretched an additional 10 to 60%, preferably 25 to 35%, in the first direction of orientation only, e.g., machine direction (MD). In order to minimize compressive stress which can adversely affect second direction heat stability, e.g., TD heat stability, it is desirable to maintain a minimal distance between the reheating roll(s) and the cooling/stretching roll(s) used in secondary orientation. Such distances can be less than 30 cm, e.g., 5 to 10 cm.

The resulting uniaxially shrinkable film after secondary orientation can range in thickness from 10 to 60 microns (0.4 to 2.4 mils), preferably 20 to 40 microns (0.8 to 1.6 mils).

Simultaneous Orientation

The films of the present invention can also be prepared by orienting on a line which utilizes linear motors to directly propel opposed pairs of tenter clips synchronously whereby primary orienting by simultaneous biaxial orienting is effected by accelerating along a diverging path directly opposed pairs of tenter clips holding the film. In other words, the film can be primarily oriented by synchronously accelerating along a diverging path, directly opposed pairs of tenter clips holding the film.

Secondary machine direction orientation on the same line can be effected along a parallel path subsequent to the diverging path by simultaneously accelerating the directly opposed pairs of tenter clips along some portion of the parallel path. In other words, the film is secondarily oriented by synchronously accelerating along a straight path, directly opposed pairs of tenter clips holding the film.

The film can be further stabilized by heat setting and annealing and subsequent cooling before leaving the tenter frame such that the resulting film will have good machine direction stability at temperatures less than 100° C. and shrinkage at 25% or more at 135° C. or greater in the machine direction and good TD direction stability at 135° C. or below, e.g., less than 5%. The use of linear motors to directly propel tenter clips to effect simultaneous biaxial stretching is further disclosed in U.S. Pat. No. 4,853,602 to Hommes, et al., the contents of which are incorporated herein by reference in their entirety.

The resulting uniaxially shrinkable film after secondary orientation can range in thickness from 10 to 60 microns, (0.4 to 2.4 mils), preferably 20 to 40 microns (0.8 to 1.6 mils).

Dimensional Stability

The resulting uniaxially shrinkable film after secondary orientation exhibits at temperatures of 1000 to 145° C., say, 135° C., greater than 10%, preferably greater than 14%, 18%, 20%, or even greater than 25% shrinkage in the direction of secondary orientation, e.g., machine direction. Shrinkage is determined by measuring the difference of sample length before and after placing the sample, unrestrained, in a 135° C. oven for 7 minutes.

Shrinkage in the direction of secondary orientation preferably occurs with minimal variation in the direction normal to said secondary orientation, e.g., transverse direction. Such variation or stability can be described in terms of the change in length of the multilayer film in the direction normal to the secondary orientation and can include both expansion and shrinkage as a percentage of the dimension prior to heat exposure. The present invention's films can exhibit ±5% stability, preferably ±3% stability, or even ±1% stability in the direction normal to that of secondary orientation. Stability of ±5% means that the dimension of the film normal to the direction of secondary orientation, after heating to 135° C. (275° F.) shrinks or expands no greater than 5% of the original dimension of the film at room temperature.

The film of the present invention can be used in high speed cigarette pack wrapping machine systems, such as GD4350 and GDC600, available from GD Co., and Focke 350 or Focke 700, available from Focke. During transport through the system each pack is subjected to heat seal regions with dwell times at fractions of a second. Success of the operation depends on the absence of pack to pack sticking, a moderate to low force necessary to move packs through the system and a seal range of at least 20° F., preferably 30–40° F. on all seal surfaces.

The film of the present invention is capable of producing a tight wrap directly off the tobacco packaging machine. Conventional films leave a wrinkled appearance especially at the top and bottom on the faces of the pack. The film of the present invention greatly reduces or eliminates this problem. The film also continues to tighten around the pack over time after the initial wrap to further remove any wrinkles which may have been present due to the packaging machine setup or hardbox design. The shrinkage results in an exceptional pack appearance with high gloss and clarity.

The invention is illustrated by the following non-limiting examples.

EXAMPLES

Example 1

A core layer composed of 95.75% by weight isotactic polypropylene of high stereoregularity, 0.1% by weight N,N-bis(2-hydroxyethyl) cocoamine, 0.1% by weight N,N-bis(2-hydroxyethyl)stearylamine, 0.05% by weight glycerol monostearate and 4% by weight syndiotactic polypropylene is melted and coextruded with 2 skin layers comprising:
(a) a top layer composed of 89.38% by weight ethylene-propylene-butene-1 terpolymer, 0.31% by weight silica antiblocking agent, 10% by weight petrolite wax, 0.16% by weight erucamide and 0.15% by weight glycerol monostearate and
(b) a bottom layer composed of 98.57% by weight ethylene-propylene-butene-1 terpolymer, 1.2% by weight silicone fluid and 0.23% by weight silica antiblocking agent.

The coextrudate is stretched 4.3 times in the machine direction using transport rolls operating at different speeds. After the desired MD orientation, the film is TD oriented in a tenter frame. After the desired TD orientation, the film is again stretched in the machine direction 31% more using transport rolls at different speeds. The top layer is corona treated.

Example 2

A core layer composed of 96% by weight isotactic polypropylene of high stereoregularity and 4% by weight syndiotactic polypropylene is melted and coextruded with 2 skin layers comprising:
(a) a top layer composed of 89.38% by weight ethylene-propylene-butene-1 terpolymer, 0.31% by weight silica antiblocking agent, 10% by weight petrolite wax, 0.16% by weight erucamide and 0.15% by weight glycerol monostearate and
(b) a bottom layer composed of 98.57% by weight ethylene-propylene-butene-1 terpolymer, 1.2% by weight silicone fluid and 0.23% by weight silica antiblocking agent.

The coextrudate is stretched 4.3 times in the machine direction using transport rolls operating at different speeds. After the desired MD orientation, the film is TD oriented in a tenter frame. After the desired TD orientation the film is again stretched in the machine direction 43% more using transport rolls at different speeds. The top layer is corona treated.

Example 3

A core layer composed of 95.65% by weight isotactic polypropylene of high stereoregularity, 0.15 by weight N,N-bis(2-hydroxyethyl)cocoamine, 0.15% by weight N,N-bis(2-hydroxyethyl)stearylamine, 0.05% by weight glycerol monostearate and 4% by weight syndiotactic polypropylene is melted and coextruded with 2 skin layers comprising:
(a) a top layer composed of 98.57% by weight ethylene-propylene-butene-1 terpolymer, 1.2% by weight silicone fluid and 0.23% by weight silica antiblocking agent and
(b) a bottom layer of 98.57% by weight ethylene-propylene-butene-1 terpolymer, 1.2% by weight silicone fluid and 0.23% by weight silica antiblocking agent.

The coextrudate is stretched 4.3 times in the machine direction using transport rolls operating at different speeds. after the desired MD orientation, the film is TD oriented in a tenter frame. After the desired TD orientation the film is again stretched in the machine direction 35% more using transport rolls at different speeds.

Example 4

A core layer composed of 96% by weight isotactic polypropylene of high stereoregularity and 4% by weight of a syndiotactic polypropylene is melted and coextruded with 2 skin layers comprising:
(a) a top layer composed of 89.38% by weight ethylene-propylene-butene-1 terpolymer, 0.31% by weight silica antiblocking agent, 10% by weight petrolite wax, 0.16% by weight erucamide and 0.15% by weight glycerol monostearate and
(b) a bottom layer composed of 98.57% by weight ethylene-propylene-butene-1 terpolymer, 1.2% by weight silicone fluid and 0.23% by weight silica antiblocking agent.

The coextrudate is stretched 4.3 times in the machine direction using transport rolls operating at different speeds. after the desired MD orientation, the film is TD oriented in a tenter frame. After the desired TD orientation the film is again stretched in the machine direction 43% more using transport rolls at different speeds. The top layer is corona treated.

Example 5

A core layer composed of 95.65% by weight isotactic polypropylene of high stereoregularity, 0.15% by weight N,N-bis(2-hydroxyethyl)cocoamine, 0.15 by weight N,N-bis(2-hydroxyethyl)stearylamine, 0.05% by weight glycerol monostearate and 4% by weight syndiotactic polypropylene is melted and coextruded with 2 skin layers comprising:
(a) a top layer composed of 99.77% by weight ethylene-propylene-butene-1 terpolymer and 0.23% by weight silica antiblocking agent and
(b) a bottom layer composed of 98.57% by weight ethylene-propylene-butene-1 terpolymer, 1.2% by weight silicone fluid and 0.23% by weight silica antiblocking agent.

The coextrudate is stretched 4.3 times in the machine direction using transport rolls operating at different speeds. after the desired MD orientation, the film is TD oriented in a tenter frame. After the desired TD orientation the film is again stretched in the machine direction 24% more using transport rolls at different speeds.

Example 6

A core layer composed of 95.75% by weight isotactic polypropylene of high stereoregularity, 0.1% by weight N,N-bis(2-hydroxyethyl)cocoamine, 0.1% by weight N,N-bis(2-hydroxyethyl)stearylamine, 0.05% by weight glycerol monostearate and 4% by weight syndiotactic polypropylene is melted and coextruded with 2 skin layers comprising:
(a) a top layer composed of 99.77% by weight ethylene-propylene-butene-1 terpolymer and 0.23% silica anti-blocking agent and
(b) a bottom layer composed of 98.57% by weight ethylene-propylene-butene-1 terpolymer, 1.2% by weight silicone fluid and 0.23% by weight silica antiblocking agent.

The coextrudate is stretched 4.3 times in the machine direction using transport rolls operating at different speeds. After the desired MD orientation, the film is TD oriented in a tenter frame. After the desired TD orientation the film is again stretched in the machine direction 39% more using transport rolls at different speeds. The top layer is corona treated.

Example 7

A core layer composed of 95.7% by weight isotactic polypropylene of high stereoregularity, 0.15% by weight N,N-bis(2-hydroxyethyl) cocoamine, 0.1% by weight N,N-bis(2-hydroxyethyl) stearylamine, 0.05% by weight glycerol monostearate and 4% by weight syndiotactic polypropylene is melted and coextruded with 2 skin layers comprising:
(a) a top layer composed of 98.47% by weight ethylene-propylene-butene-1 terpolymer, 1.2% by weight silicone fluid, 0.23% by weight silica antiblocking agent and 0.1% by weight non-meltable silicone particles and
(b) a bottom layer composed of 98.47% by weight ethylene-propylene-butene-1 terpolymer, 1.2% by weight silicone fluid, 0.23% by weight silica antiblocking agent and 0.1% by weight non-meltable silicone particles.

The coextrudate is stretched 4.3 times in the machine direction using transport rolls operating at different speeds. After the desired MD orientation, the film is TD oriented in a tenter frame. After the desired TD orientation the film is again stretched in the machine direction 39% more using transport rolls at different speeds.

Example 8

A core layer composed of 95.85% by weight isotactic polypropylene of high stereoregularity, 0.15 by weight N,N-bis(2-hydroxyethyl)cocoamine and 4% by weight syndiotactic polypropylene is melted and coextruded with 2 skin layers comprising:
(a) a top layer composed of 98.97% by weight ethylene-propylene-butene-1 terpolymer, 0.8% by weight silicone fluid and 0.23% by weight silica antiblocking agent and
(b) a bottom layer of 98.97% by weight ethylene-propylene-butene-1 terpolymer, 0.8% by weight silicone fluid and 0.23% by weight silica antiblocking agent.

The coextrudate is stretched 4.3 times in the machine direction using transport rolls operating at different speeds. after the desired MD orientation, the film is TD oriented in a tenter frame. After the desired TD orientation the film is again stretched in the machine direction 43% more using transport rolls at different speeds.

Example 9

This example shows cigarette pack tightness measurements for the multilayer film made in accordance with Example 8, above, in comparison to a non-shrink film, ZNA20, available from Hoescht. For this example, the GDC600 Wrapper Machine, available from GDC Co. is used to wrap Kent Super Lights cigarette packs. The same wrap off a single pack was measured 3 times. The wrap tightness measurements are in millimeters (mm), offset from zero. Larger values reflect a tighter wrap. The wrap tightness is measured using the apparatus as shown in FIG. 1. The cigarette wrap is placed over fixed arm 2 and movable arm 4. Spring 6 moves movable arm 4 so the measurement taken is the width of the wrap from the test cigarette pack. The distance measurement from movable arm 4 to micrometer 8 demonstrates wrap tightness. The larger mm reading indicates a tighter wrap. The measurements are shown below in Tables 1, 2 and 3.

TABLE 1

Comparison Film (.8 mil thickness)

|  | Measurement 1 | Measurement 2 | Measurement 3 |
|---|---|---|---|
| Pack No. 1 | 1.27 | 1.26 | 1.25 |
| Pack No. 2 | 1.42 | 1.41 | 1.41 |
| Pack No. 3 | 1.37 | 1.37 | 1.37 |
| Pack No. 4 | 1.33 | 1.32 | 1.33 |
| Pack No. 5 | 1.39 | 1.39 | 1.39 |
|  | avg= | 1.35 |  |

TABLE 2

Example 8 Film (.95 mil thickness)

|  | Measurement 1 | Measurement 2 | Measurement 3 |
|---|---|---|---|
| Pack No. 1 | 1.73 | 1.72 | 1.71 |
| Pack No. 2 | 1.54 | 1.54 | 1.54 |
| Pack No. 3 | 1.57 | 1.52 | 1.53 |
| Pack No. 4 | 1.56 | 1.54 | 1.54 |
| Pack No. 5 | 1.67 | 1.66 | 1.66 |
| Pack No. 6 | 1.58 | 1.52 | 1.52 |
| Pack No. 7 | 1.63 | 1.63 | 1.63 |
| Pack No. 8 | 1.54 | 1.54 | 1.54 |
| Pack No. 9 | 1.76 | 1.75 | 1.75 |
| Pack No. 10 | 1.65 | 1.65 | 1.66 |
|  | avg= | 1.61 |  |

TABLE 3

Example 8 Film (.85 mil thickness)

|  | Measurement 1 | Measurement 2 | Measurement 3 |
|---|---|---|---|
| Pack No. 1 | 1.46 | 1.47 | 1.47 |
| Pack No. 2 | 1.56 | 1.55 | 1.55 |
| Pack No. 3 | 1.51 | 1.48 | 1.48 |
| Pack No. 4 | 1.48 | 1.48 | 1.48 |
| Pack No. 5 | 1.54 | 1.51 | 1.51 |
| Pack No. 6 | 1.5 | 1.52 | 1.52 |
| Pack No. 7 | 1.48 | 1.18 | 1.48 |
| Pack No. 8 | 1.55 | 1.54 | 1.54 |
| Pack No. 9 | 1.47 | 1.48 | 1.48 |
| Pack No. 10 | 1.5 | 1.5 | 1.51 |
|  | avg= | 1.49 |  |

Example 10

Example 9 above is repeated using Kent Special Milds (Red Ink) cigarette packs and a GD4350 Wrapper Machine available from GD Co. The measurements are shown below in Tables 4 and 5. The average measurements from Tables 1 to 5 are summarized in Table 6. Table 6 clearly shows a tighter wrap using the multilayer film of the present invention.

TABLE 4

Comparison Film (.8 mil thickness)

|  | Measurement 1 | Measurement 2 | Measurement 3 |
|---|---|---|---|
| Pack No. 1 | 0.81 | 0.81 | 0.78 |
| Pack No. 2 | 0.81 | 0.81 | 0.79 |
| Pack No. 3 | 0.92 | 0.91 | 0.87 |
| Pack No. 4 | 0.84 | 0.84 | 0.84 |
| Pack No. 5 | 0.9 | 0.89 | 0.89 |
|  | avg= | 0.85 |  |

TABLE 5

Example 8 Film (.95 mil thickness)

|  | Measurement 1 | Measurement 2 | Measurement 3 |
|---|---|---|---|
| Pack No. 1 | 1.46 | 1.46 | 1.45 |
| Pack No. 2 | 1.47 | 1.43 | 1.42 |
| Pack No. 3 | 1.43 | 1.43 | 1.42 |
| Pack No. 4 | 1.41 | 1.41 | 1.42 |
| Pack No. 5 | 1.45 | 1.42 | 1.41 |
|  | avg= | 1.43 |  |

TABLE 6

Summary

| Film Type | mm offset from 0 Avg |
|---|---|
| Table 1 (Comparison Film) | 1.35 |
| Table 2 (Example 8 Film) | 1.61 |
| Table 3 (Example 8 Film) | 1.62 |
| Table 4 (Comparison Film) | 0.85 |
| Table 5 (Example 8 Film) | 1.43 |

It will be apparent to those skilled in the art that the specific embodiments discussed above can be successfully repeated with ingredients equivalent to those generically or specifically set forth above and under variable process conditions. From the foregoing specification, one skilled in the art can readily ascertain the essential features of this invention and without departing from the spirit and scope thereof can adapt it to various diverse applications.

It is claimed:

1. A tobacco pack or carton overwrap film comprising a uniaxially heat-shrinkable, biaxially oriented, multilayer film having a polypropylene containing core layer, said core layer comprising isotactic polypropylene and a modifier which reduces the crystallinity of the polypropylene-containing core layer and at least one polyolefin containing skin layer adjacent said core layer, said skin layer comprising silicone oil, wherein said modifier is selected from the group consisting of atactic polypropylene, syndiotactic polypropylene, ethylene-propylene copolymer, propylene-butene-1 copolymer, ethylene propylene-butene-1 terpolymer, polybutene-1, polyethylene and linear low density polyethylene.

2. The multilayer film of claim 1, wherein said modifier is selected from the group consisting of atactic polypropylene, syndiotactic polypropylene, ethylene-propylene copolymer, propylene-butene-1 copolymer, ethylene-propylene-butene-1 terpolymer, polybutene-1, polyethylene and linear low density polyethylene.

3. The multilayer film of claim 1, wherein said modifier comprises syndiotactic polypropylene.

4. The multilayer film of claim 1, wherein said core layer further comprises an antistatic agent selected from the group consisting glycerides, tertiary amines and mixtures thereof.

5. The multilayer film of claim 1, wherein said skin layer is selected from at least one of the group consisting of polypropylene, ethylene-propylene copolymer, polyethylene, propylene-butene-1 copolymer, and ethylene-propylene-butene-1 terpolymer, said skin layer having a thickness of 0.5 to 1.0 micron.

6. The multilayer film of claim 1, wherein said skin layer further comprises silica and/or a non-meltable silicone resin.

7. The multilayer film of claim 1, wherein said skin layer further comprises an amide of a water insoluble monocarboxylic acid.

8. The mulilayer film structure of claim 1, wherein both skin layers comprise silicone oil.

9. The multilayer film of claim 1, wherein said skin layer is corona or flame treated.

10. The multilayer film of claim 1, which is primarily oriented by biaxially orienting 3 to 8 times in the machine direction, and 6 to 12 times in the transverse direction, and secondarily oriented by reorienting an additional 10 to 60% in the machine direction.

11. The multilayer film of claim 1, wherein said film is capable of greater than 15% shrinkage at 100° to 145° C. in a first direction with ±5% stability in a second direction substantially normal to said first direction.

* * * * *